United States Patent [19]

Kogon

[11] 3,997,514
[45] Dec. 14, 1976

[54] POLYURETHANE ELASTOMERS HAVING A COMPRESSION SET OF 50 OR LESS

[75] Inventor: Irving Charles Kogon, Wilmington, Del.

[73] Assignee: E. I. Du Pont de Nemours and Company, Wilmington, Del.

[22] Filed: Apr. 30, 1975

[21] Appl. No.: 573,599

[52] U.S. Cl. ............... 260/77.5 AM; 260/77.5 AT
[51] Int. Cl.$^2$ ................. C08G 18/32; C08G 18/75
[58] Field of Search ... 260/75 NE, 75 NT, 77.5 AA, 260/77.5 AT

[56] References Cited
UNITED STATES PATENTS

| | | | |
|---|---|---|---|
| 2,929,800 | 3/1960 | Hill | 260/77.5 AA |
| 3,211,701 | 10/1965 | Mueller et al. | 260/75 NE |
| 3,600,358 | 8/1971 | Taub | 260/75 NT |
| 3,637,599 | 1/1972 | Ditty | 260/75 NT |
| 3,706,710 | 12/1972 | Camilleri et al. | 260/75 NT |
| 3,766,148 | 10/1973 | Taub | 260/77.5 AT |
| 3,789,032 | 1/1974 | Hoeschele | 260/77.5 AT |

OTHER PUBLICATIONS

Follett–Modern American Usage, Hill and Wang, N.Y. 1966, pp. 105–106.

*Primary Examiner*—H. S. Cockeram

[57] ABSTRACT

A polyurethane composition is prepared by (1) reacting excess polyalkylene ether or polyester glycol with an aromatic diisocyanate, (2) reacting the product of (1) with excess aliphatic diisocyanate, and (3) curing the resulting prepolymer with an aromatic diamine.

1 Claim, No Drawings

POLYURETHANE ELASTOMERS HAVING A COMPRESSION SET OF 50 OR LESS

It is well known in the art to prepare polyurethane elastomers by reacting excess polyisocyanate with a polyol to form a liquid NCO-terminated polyurethane prepolymer, which can then be reacted with a diamine curing agent to form a polyurethane/polyurea elastomer. In one specific embodiment a poly(alkylene ether)glycol is reacted with excess methylene-bis(4-cyclohexylisocyanate), called PICM, to form the corresponding NCO-terminated polyether, which is then cured or vulcanized by reacting with a suitable diamine. Unfortunately, some of these vulcanizates exhibit poor "compression set", which forecloses their use in molded articles which are to be used under load as in machine rolls and wheels.

For such load-bearing uses it is essential that the vulcanizate exhibit high dimensional stability so as to retain its resilience and not form flat spots under extended use. This virtue is known in the trade as "good compression set". Compression set is determined by ASTM Method D395–55 and represents the amount of residual deformation that occurs when a vulcanized sample is placed under load sufficient to reduce its height to a specified value, held under that load for a certain period of time at a constant temperature, and then released from the load. Thus, if the height before sample loading is 100 units and it is compressed under load to a height of 90 units, but recovers to a height of 95 units when the load is removed its compression set is 50%, i.e., 50% of the deformation was permanent. Obviously, the lower the compression set value for a given resin the better it is for load-bearing uses. It is an objective of this invention to provide a polyurethane composition which performs well by this standard.

In the process of the present invention an isocyanate-terminated prepolymer is prepared and vulcanized by the steps of 1. endcapping an aromatic diisocyanate such as 2,4-tolylene diisocyante with a glycol such as poly(tetramethylene ether)glycol (M.W. about 1,000),
2. reacting the resulting intermediate with an aliphatic diisocyanate to form a prepolymer, and
3. curing the prepolymer with a suitable diamine to form a vulcanizate having improved compression set, specifically 50 or less. At the same time a saving in material costs is attained from reducing the amount of aliphatic diisocyanate that would otherwise be used in preparing the prepolymer and substituting a readily available aromatic diisocyanate. Examples of such aromatic diisocyanates are tolylene-2,4-diisocyanate, tolylene-2,6-diisocyanate, and mixtures thereof, methylene-bis(4-phenylisocyanate) and its alkyl and alkoxy-substituted derivatives, 1,2- and 1,4-phenylene diisocyanates, and ring-halogenated derivatives of these aromatic diisocyanates.

The preferred aliphatic diisocyanate is methylene-bis(4-cyclohexylisocyanate) but other aliphatic diisocyanates are also operative; these include hexamethylene diisocyanate, meta- and para-xylene diisocyanate, methyl 2,6-diisocyanatohexoate, hydrogenated toluene diisocyanate, β,β'-diisocyanato-1,2-diethylbenzene, bis(2-isocyanatoethyl) carbamate, bis(2-isocyanatoethyl)4-cyclohexene-1,2-dicarboxylate, 2,2,4-trimethylhexamethylene diisocyanate, isophorone diisocyanate, 5-methyl-4,7-dioxadecance-2,9-diisocyanate and dimeryl diisocyanate.

In another embodiment of the invention steps 1 and 2 leading to the formation of the prepolymer can be combined by mixing the poly(alkylene ether)glycol with both the aromatic diisocyanate and the aliphatic diisocyanate and conducting the reaction in two stages so that the respective isocyanates react successively. For example, if poly(tetramethylene ether)glycol is mixed in excess with 2,4-tolylene diisocyanate as the aromatic diisocyanate and with low trans-trans content methylene-bis(4-cyclohexylisocyanate) as the aliphatic diisocyanate, and then heated to 80° C. the 2,4-tolylene diisocyanate will react with the glycol to form the glycol-terminated product. About one-half hour is generally sufficient for the reaction time. In the next step the temperature is raised to 120° C., at which temperature the methylene-bis(4-cyclohexylisocyanate) reacts with the glycol-terminated product over a period of about two hours to form the prepolymer.

The total aromatic-aliphatic diisocyanate mixture may contain 10–75 mole % aromatic diisocyanate, preferably 25–50 mole %.

The prepolymer should contain 1.4–2.2 moles total diisocyanate per 1 mole glycol. The preferred range is 1.8–2.0 moles.

Capping of the aromatic diisocyanate with the glycol is carried out at atmospheric pressure and a temperature of 25°–150° C. in the absence or presence of a catalyst such as a tertiary amine, tin dibutyl dilaurate, stannous octoate, or ferric acetyl acetonate. The reaction will be completed in 5 minutes to 24 hours depending on the catalyst and the temperature. The capping of the resulting mixture with the aliphatic diisocyanate to form the prepolymer can be carried out under the same conditions.

The prepolymer may also be diluted with plasticizers such as dipropylene glycol dibenzoate (sold as "Benzoflex" 9–88 by Velsicol Chemical Co.) and tetraethylene glycol dioctoate (solid as "Flexol" 4GO by Union Carbide). Such diluents are not removed prior to the curing of the prepolymer. Example 10 illustrates the use of such a diluent.

Aromatic polyamines containing two or more active hydrogen atoms are very useful as cross-linking agents. Arylene polyamines may be used as the cross-linking agents. The term "arylene polyamine" as used herein means a compound in which each of two or more amino groups is attached to the same or to different benzene radicals or related polycyclic aromatic hydrocarbon radicals. Representative polyamines include derivatives of tolylene diamines, metaphenylene diamines and phenylene diamines, for example, 2,5-dichlorophenylene-1,4-diamine and 4,4'-methylene dianiline.

It is worth noting that the preparation of a polyurethane composition by the process of this invention provides considerable latitude in selecting the curing agent to be used in vulcanizing the prepolymer. A good curing agent must impart good "pot life" or working time to the liquid prepolymer-diamine mixture so that the latter can be cast and remain fluid until the proper curing or vulcanization temperature is reached. At least one of the diamines customarily used in the curing of aromatic NCO-terminated polyurethane prepolymers is now listed as carcinogenic, and the most available replacement, 4,4'-methylene dianiline, is much too fast curing. However, it can be used to good advantage in the curing of the aliphatic NCO-terminated polyurethane prepolymers of the present invention, since these are less reactive than aromatic diisocyanate-terminated prepolymers.

Good results are also obtained by using as the crosslinking agent the crude condensation product prepared by condensing aniline, o-chloroaniline and formaldehyde, employing about 1.65–1.9 moles of amine per mole of formaldehyde, and a ratio of aniline to 2-chloroaniline of about 0.1–4.0.

The amines are employed in the amount of about 3–15 % by weight based on the weight of the polymeric polyol, and it is preferable to employ amines or mixtures of amines containing hindered amino groups and primarily composed of two linked phenyl radicals each containing an amino group.

The polyether and polyester polyols normally used in the preparation of polyurethane elastomers can be employed in preparing the compositions of this invention. These polyols are preferably diols, but minor amounts of higher functionality polyols may be used in admixture with diols. Representative polyols are polyalkylene ether glycols such as polyethylene ether glycol, polypropylene ether glycol, and poly (tetramethylene ether) glycol and the polyethers prepared by the copolymerization of cyclic ethers such as ethylene oxide, propylene oxide, trimethylene oxide, and tetrahydrofuran with aliphatic polyols such as ethylene glycol, 1,3-butadediol, diethylene glycol, dipropylene glycol, 1,2-propylene glycol, and 1,3-propylene glycol; polyester glycols prepared by the polymerization of cyclic lactones such as ε-caprolactone or by the condensation polymerization of a dicarboxylic acid or its condensation equivalent and a molar excess of an organic polyol, representative diacids being succinic, glutaric and adipic acids and representative organic polyols being ethylene glycol, propylene glycol, 1,3-butanediol, 1,4-butanediol, 1,6-hexanediol, neopentyl glycol, and mixtures thereof. Polyurethanes based on polyesters have improved tear strength, but reduced hydrolytic stability because of the tendency of the polyesters to hydrolyze in the presence of water. The preferred polyols have molecular weights of about 600–2000; polyalkylene ether polyols in this molecular weight range are especially preferred. A particularly effective polyol is poly(tetramethylene ether) glycol having a molecular weight of about 1000.

It is also possible to employ as part of the polyol component an aliphatic polyol having a low molecular weight (below about 350) such as ethylene glycol, 1,3-butanediol, 1,4-butanediol, and diethylene glycol. Such low molecular weight glycols are normally used in amounts up to about 50% by weight of the total polyol used. Minor amounts (20 wt. %) of polyfunctional polyols such as trimethylolpropane and glycerol can also be used.

EXAMPLES

The prepolymers described in the following examples, including controls, were vulcanized by mixing with 0.475 moles of 4,4'methylenedianiline per mole of —NCO content, and heating for 10 hours at 100° C., followed by post-curing one week at room temperature and 50% relative humidity. Compression set and hardness were determined for the vulcanized samples by ASTM Method D395–55 and ASTM Method D76–58T, respectively. Brookfield viscosity was determined by ASTM Method D1417–73.

Control 1

This illustrates the poor compression set obtained when only aliphatic diisocyanates are used to prepare the prepolymers.

A. A prepolymer was prepared by reacting 0.1 moles poly(tetramethylene ether)glycol (PTMEG) (molecular weight 2050) and 0.37 moles poly(tetramethylene ether)glycol (molecular weight 975) with 1.0 mole methylene-bis(4-cyclohexylisocyanate) (PICM) (trans-trans-content 20 wt. %) at 125° C. for 2 hours with stirring. The resulting prepolymer had an isocyanate content of 4.82 wt. % and a Brookfield viscosity at 100° C. of 1600 cps. Vulcanizate Properties: Hardness, Shore D 44, Shore A 86; Compression Set, 59–65%.

B. A prepolymer was prepared by reacting 1 mole PTMEG (mol. wt. 975) with 2.0 moles of PICM (t,t-content 20 wt. %) at 125° C. for 2 hours. The resulting polymer had an isocyanate content of 5.40 wt. % and a Brookfield viscosity at 100° C. of 1100 cps. Vulcanizate Properties: Hardness, Shore D 47; Compression Set, 74%.

Control 2

This illustrates the poor compression set obtained when a mixture of an aliphatic polyisocyanate-capped glycol and an aromatic diisocyanate is cured.

A prepolymer was prepared by reacting a mixture consisting of 0.45 moles PTMEG (mol. wt. 975) and 0.143 moles PTMEG (mol. wt. 2050) with 0.98 moles of PICM (t,t-content 20 wt. %) for 2 hours at 120° C. Then 0.22 moles of 2,4-tolylene diisocyanate was added and the mass agitated at 130° C. for 2 hours. The resulting polymer had an isocyanate content of 4.87 wt. %. Vulcanizate Properties: Hardness, Shore A 89; Compression Set, 80%.

Control 3

This illustrates the poor compression set obtained from a prepolymer which is prepared by endcapping an aliphatic diisocyanate with a glycol and endcapping the product with a mixture of PICM (trans, trans content 20 wt. %) and aromatic diisocyanate.

A prepolymer was prepared by reacting a mixture consisting of 1.0 mole PTMEG (mol. wt. 975) and 0.5 moles of PICM (t,t-content 20 wt. %) at 130° C. for 2 hours. To one-half of this material at 80° C. was added 0.5 moles of a 80/20 wt. % mixture of 2,4- and 2,6-tolylene diisocyanate and the mixture stirred for 1 hour. To the remaining half of the material was added 1 mole of PICM (t,t-content 20 wt. %) and the mixture heated at 130° C. for 1 hour. The two prepolymers were combined and agitated for 15 minutes. The resulting prepolymer mixture had an isocyanate content of 5.701 wt. %. Vulcanizate properties: Hardness, Shore D 45, Compression Set, 69%.

The following examples all illustrate the low compression set obtained when the prepolymers are so prepared that they are capped with aliphatic diisocyanates.

EXAMPLE 1

A prepolymer was prepared by reacting 1.0 mole PTMEG (mol. wt. 975) with 0.4 moles 2,4-tolylene diisocyanate at 80° C. for 30 minutes. Then 1.6 moles of PICM (t,t-content 20 wt. %) was added and the mass agitated at 120° C. for 2 hours. The resulting prepolymer has an isocyanate content of 6.02 wt. % and a Brookfield viscosity at 100° C. of 2800 cps. Vulcanizate Properties: Hardness, Shore D 45; Compression Set, 43%.

EXAMPLE 2

A prepolymer was prepared by reacting 1 mole PTMEG (mol. wt. 975) with 0.6 moles of 2,4-tolylene diisocyanate at 80° C. for 30 minutes. Then 1.4 moles of PICM (t,t-content 20 wt. %) was added and the mass agitated at 120° C. for 2 hours. The resulting prepolymer has an isocyanate content of 5.75 wt. % and a Brookfield viscosity at 100° C. of 7200 cps. Vulcanizate Properties: Hardness, Shore D 43; Compression Set, 33%.

EXAMPLE 3

A. A prepolymer was prepared by reacting 0.75 moles PTMEG (mol. wt. 975) with 0.375 moles of an 80/20 wt. % mixture of 2,4- and 2,6-tolylene diisocyanate for 1 hour at 80° C. Then 1.125 moles of PICM (t,t-content 20 wt. %) is added and the mass agitated at 125° C. for 3 hours. The resulting polymer has an isocyanate content of 5.37 wt. % and a Brookfield viscosity at 100° C. of 1800 cps. Vulcanizate Properties: Hardness, Shore A 89; Compression Set, 48%.

B. Example 3A was repeated except that the mixture of 2,4- and 2,6-tolylene diisocyanate was replaced by methylene bis(4-phenyl isocyanate). The resulting polymer had an isocyanate content of 5.35 wt. % and a Brookfield viscosity of 3350 cps at 100° C. Vulcanizate Properties: Hardness, Shore A 88; Compression Set, 44%.

EXAMPLE 4

A polymer was prepared by adding 0.75 moles PTMEG (mol. wt. 975) to an agitated mixture consisting of 1.125 moles PICM (t,t-content 20 wt. %) and 0.375 moles methylene bis(4-phenylisocyanate). The reaction mixture was heated 1 hour at 80° C., then 3 hours at 125° C. The resulting polymer had an isocyanate content of 5.45 wt. % and a Brookfield viscosity at 100° C. of 3500 cps. Vulcanizate Properties: Hardness, Shore D 43; Compression Set, 49%.

EXAMPLE 5

A prepolymer was prepared by reacting 0.75 moles PTMEG (mol. wt. 915) with 0.375 moles of a 65/35 wt. % mixture of 2,4- and 2,6-tolylene diisocyanate for 1 hour at 80° C. Then 1.4 moles of PICM (t,t-content 20 wt. %) was added and the mass agitated at 125° C. for 3 hours. The resulting polymer had an isocyanate content of 5.37 wt. % and a Brookfield viscosity at 100° C. of 3100 cps. Vulcanizate Properties: Hardness, Shore A 87; Compression Set, 38%.

EXAMPLE 6

A prepolymer was prepared by reacting 1.3 moles PTMEG (mol. wt. 650) with 0.6 moles of an 80/20 wt. % mixture of 2,4- and 2,6-tolylene diisocyanate for 1 hour at 80° C. Then 1.4 moles of PICM (t,t-content 20 wt. %) was added and the mass agitated at 125° C. for 3 hours. The resulting polymer had an isocyanate content of 4.12 wt. %. Vulcanizate Properties: Hardness, Shore A 84; Compression Set, 44%.

EXAMPLE 7

To a mixture of 1.3 moles PICM (t,t-content 20 wt. %) and 0.35 moles of an 80/20 wt. % mixture of 2,4- and 2,6-tolylene diisocyanate was added 0.10 moles poly(propylene-ether)glycol (mol. wt. 425). The mixture was heated at 90° C. for 2 hours. Then 0.75 moles PTMEG (mol. wt. 975) was added and the mixture heated at 130° C. for 2 hours. The resulting polymer had an isocyanate content of 5.41 wt. % and a Brookfield viscosity at 100° C. of 2250 cps. Vulcanizate Properties: Hardness, Shore D 47; Compression Set, 41%.

EXAMPLE 8

To a mixture of 0.55 moles PICM (t,t-content 20 wt. %) and 0.181 moles of methylene bis(4-phenyl isocyanate was added 0.375 moles PTMEG (mol. wt. 975). The mixture was heated 1 hour at 80° C. followed by 3 hours at 130° C. The resulting prepolymer had an isocyanate content of 5.25 wt. % and a Brookfield viscosity of 433 4300 cps. Vulcanizate Properties: Hardness, Shore D 46; Compression Set, 47%.

EXAMPLE 9

This example illustrates how the compression set can be further lowered when the prepolymer is capped with a 70% trans, trans PICM, as compared to employing a 20% trans, trans PICM.

A. A prepolymer was prepared by reacting 0.75 moles PTMEG (mol. wt. 975) with 0.375 moles of an 80/20 wt. % mixture of 2,4- and 2,6-tolylene diisocyanate for 1 hour at 80° C. Then 1.125 moles of PICM (t,t-content 20 wt. %) is added and the mass agitated at 125° C. for 3 hours. The resulting polymer has an isocyante content of 5.37 wt. % and a Brookfield viscosity at 100° C. of 1800 cps. Vulcanizate Properties: Hardness, Shore A 89; Compression Set, 48%.

B. Example 9(A) was repeated replacing PICM (t,t-content 20 wt. %) with PICM (t,t-content 70 wt. %). The resulting polymer had an isocyanate content of 5.31 wt. % and a Brookfield viscosity of 2200 cps. at 100° C. Vulcanizate Properties: Hardness, Shore D 42; Compression Set, 35%.

EXAMPLE 10

This example illustrates the use of a plasticizer to reduce solution and compound viscosity.

A prepolymer was prepared by heating for one hour at 80° C. a mixture of 0.75 moles PTMEG (mol. wt. 975), 0.187 moles diethylene glycol, and 0.6 moles of an 80/20 wt. % mixture of 2,4- and 2,6-tolylene diisocyanate. To the reaction mixture was added 1.3 moles PICM (t,t-content 20 wt.%) and the mass agitated at 130° C. for 3 hours. To the mixture was added 130 gm. dipropylene glycol dibenzoate (sold as "Benzoflex" 9–88 by Velsicol Chemical Co.) and the mixture further agitated at 130° C. for 15 min. The resulting polymer mixture had an isocyanate content of 5.72 wt. % and a Brookfield viscosity at 100° C. of 2600 cps. Vulcanizate Properties: Hardness, Shore D 45; Compression Set, 41%.

I claim:

1. In a process wherein 2,4-tolylene diisocyanate is reacted with a poly(tetramethylene ether) glycol to form an NCO-terminated polyurethane prepolymer and the latter is cured to form a polyurea/polyurethane elastomer, the improvement of preparing said prepolymer in two steps in the first of which the diisocyanate is mixed with a stoichiometric excess of poly(tetramethylene ether) glycol having a molecular weight of about 1000, and said mixture is heated to a temperature sufficient to effect a reaction between said isocyanate and said glycol; in the second step, a stoichiometric excess of methylenebis-4-cyclohexylisocyanate is added, and the mixture is heated to form an NCO-terminated polyurethane prepolymer; and said prepolymer is cured with 4,4'-methylenedianiline to form a vulcanizate having a compression set of 50 or less.

* * * * *